United States Patent
Petre et al.

(10) Patent No.: US 10,211,856 B1
(45) Date of Patent: Feb. 19, 2019

(54) HARDWARE SCALABLE CHANNELIZER UTILIZING A NEUROMORPHIC APPROACH

(71) Applicant: The Boeing Company, Chicago, IL (US)

(72) Inventors: Peter Petre, Oak Park, CA (US); Daniel S. Matic, Newbury Park, CA (US); Gabriel L. Virbila, Venice, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/782,815

(22) Filed: Oct. 12, 2017

(51) Int. Cl.
*H04B 1/00* (2006.01)
*H04B 1/18* (2006.01)
*G06N 3/04* (2006.01)
*H04L 5/00* (2006.01)

(52) U.S. Cl.
CPC ........... *H04B 1/001* (2013.01); *G06N 3/0454* (2013.01); *H04B 1/18* (2013.01); *H04L 5/0064* (2013.01)

(58) Field of Classification Search
CPC ......... H04B 1/001; H04B 1/18; H04L 5/0064; G06N 3/0454
See application file for complete search history.

(56) References Cited

U.S. PATENT DOCUMENTS

| | | | |
|---|---|---|---|
| 5,926,455 A * | 7/1999 | Allpress | H03H 17/0277 370/210 |
| 6,282,184 B1 * | 8/2001 | Lehman | H04B 1/0003 370/278 |
| 6,898,235 B1 * | 5/2005 | Carlin | H04B 1/001 342/147 |
| 9,191,043 B1 * | 11/2015 | Zhang | H03H 17/0273 |
| 9,749,007 B1 * | 8/2017 | Martin | H04B 1/719 |
| 9,824,311 B1 * | 11/2017 | Cruz-Albrecht | G06N 3/08 |
| 9,866,422 B1 * | 1/2018 | Ray | H04L 27/2688 |
| 2003/0058971 A1 * | 3/2003 | Langford | G01S 3/50 375/343 |
| 2003/0072277 A1 * | 4/2003 | Subrahmanya | H04L 25/0214 370/320 |
| 2003/0076899 A1 * | 4/2003 | Kumar | H04L 5/06 375/316 |
| 2015/0095273 A1 * | 4/2015 | Sarah | G06N 3/049 706/25 |
| 2016/0071005 A1 * | 3/2016 | Wang | G06F 17/15 706/25 |
| 2017/0279521 A1 * | 9/2017 | Hughes | H04B 17/00 |

\* cited by examiner

*Primary Examiner* — Kenneth T Lam

(57) ABSTRACT

Disclosed is a hardware scalable channelizer ("HSC"). The HSC includes an integrated circuit ("IC") that utilizes neuromorphic processing. The IC also includes an IC input configured to receive an input signal and a plurality of infinite impulse response ("IIR") channelizer filters in signal communication with the IC input, where each IIR channelizer filter of the plurality of IIR channelizer filters is configured to select a frequency band from the input signal and provide synchronous filtering of the input signal.

19 Claims, 11 Drawing Sheets

HARDWARE SCALABLE CHANNELIZER UTILIZING A NEUROMORPHIC APPROACH

BACKGROUND

1. Field

This present disclosure is related to wideband systems and, more particularly, wideband systems that utilize channelizers.

2. Related Art

At present, technology has allowed for the design and production of wide bandwidth and ultra-wide bandwidth communication and detection systems for utilization in both commercial telecommunications and electronic warfare ("EW") systems. In the case of EW systems, electronic support measures ("ESM") systems that allow for detecting, intercepting, identifying, locating, tracking, recording, or analyzing sources of radiated electromagnetic energy for the purposes of immediate threat recognition. Many of these types of systems gather intelligence through passive monitoring of electromagnetic radiations of interest.

In general, ultra-wide bandwidth systems (also known as "UWB," "ultra-wideband," "ultra-wide band," and "ultra-band") utilize radio technology that utilizes very low energy level for short-range, high-bandwidth communications over a larger portion of the radio spectrum. Typically, ultra-wide bandwidth systems utilize a bandwidth that significantly exceeds the coherence bandwidth of a channel of the system. As such, as the bandwidth increases, the known hardware implementations for ultra-wide bandwidth systems cannot keep pace with the increasing bandwidth requirements.

Attempts to lessen this problem have included utilizing systems having multiple channelizers, having finite impulse response ("FIR") filters, to reduce a bandwidth of detection (i.e., the bandwidth that the system is monitoring for the presence of signals) into multiple sub-bands, where each of the sub-bands is processed on parallel channels of the system. Unfortunately, this known approach generally does not solve latency signal detection issues over an ultra-wide instantaneous bandwidth (for example, at greater than 1 GHz). Therefore, there is a need for an improved system and method that utilizes improved channelizers that addresses these issues.

SUMMARY

Disclosed is a hardware scalable channelizer ("HSC"). The HSC includes an integrated circuit ("IC") that utilizes neuromorphic processing. The IC also includes an IC input configured to receive an input signal and a plurality of infinite impulse response ("IIR") channelizer filters in signal communication with the IC input, where each IIR channelizer filter of the plurality of IIR channelizer filters is configured to select a frequency band from the input signal and provide synchronous filtering of the input signal.

In an example of operation, the HSC performs a method that utilizes the neuromorphic processing to channelize and process the input signal. The method includes receiving the input signal at the IC, selecting at plurality of frequency bands from the input signal utilizing a parallel neuromorphic processor architecture of the HSC, and synchronous filtering the input signal utilizing the selected plurality of frequency bands.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

A hardware scalable channelizer ("HSC") is disclosed. The HSC includes an integrated circuit ("IC") that utilizes neuromorphic processing. The IC also includes an IC input configured to receive an input signal and a plurality of infinite impulse response ("IIR") channelizer filters in signal communication with the IC input, where each IIR channelizer filter of the plurality of IIR channelizer filters is configured to select a frequency band from the input signal and provide synchronous filtering of the input signal.

In an example of operation, the HSC performs a method that utilizes the neuromorphic processing to channelize and process the input signal. The method includes receiving the input signal at the IC, selecting at plurality of frequency bands from the input signal utilizing a parallel neuromorphic processor architecture of the HSC, and synchronous filtering the input signal utilizing the selected plurality of frequency bands.

Figure 1:
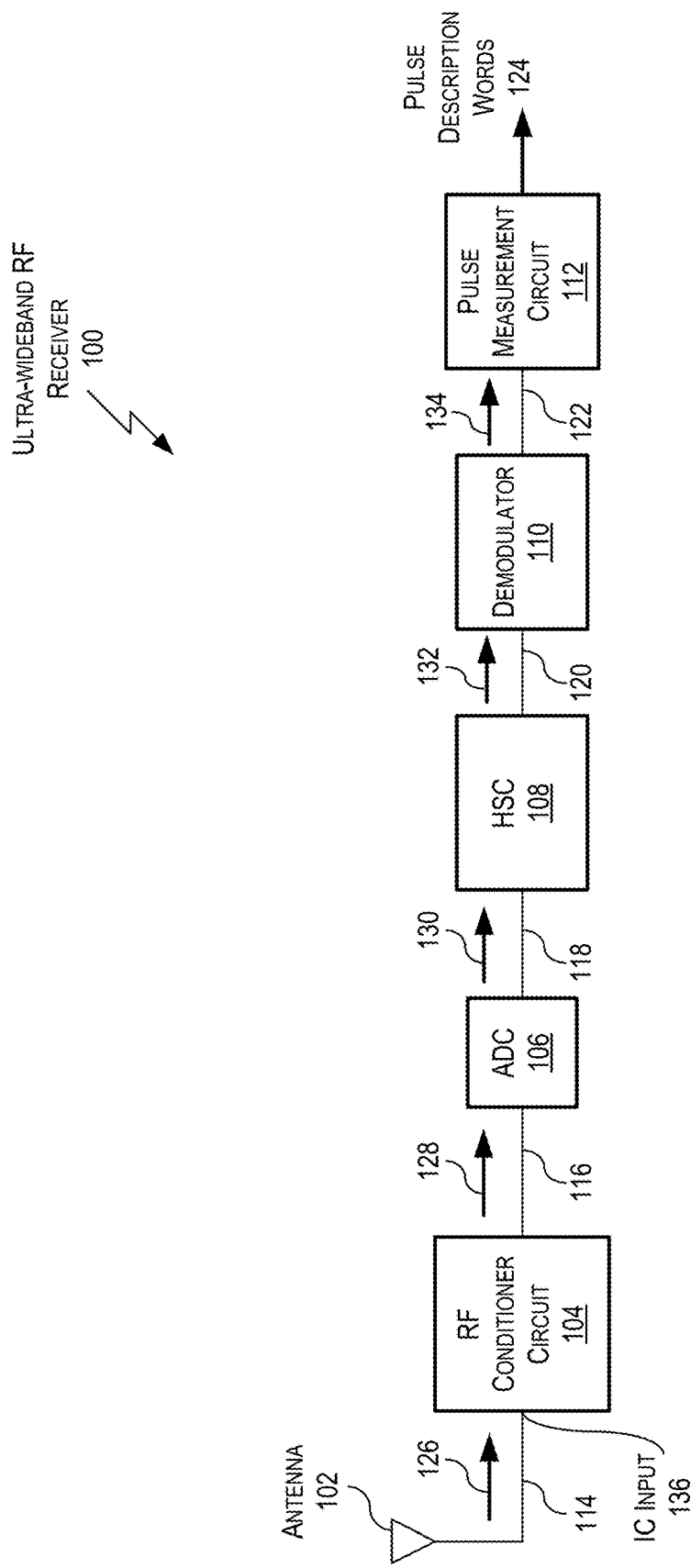
FIG. 1 is a block diagram of an example of an implementation of an ultra-wideband radio-frequency ("RF") receiver architecture in accordance with the present disclosure.

In FIG. 1, a block diagram is shown of an example of an implementation of an ultra-wideband radio-frequency ("RF") receiver 100 architecture in accordance with the present disclosure. In this example, the ultra-wideband RF receiver 100 includes an antenna 102, RF conditioner circuit 104, an analog-to-digital converter ("ADC") 106, the HSC 108, a demodulator 110, and a pulse measurement circuit 112.

In this example, the RF conditioner circuit 104 is in signal communication with the antenna 102 via signal path 114. The ADC 106 is in signal path with both the RF conditioner circuit 104 and the HSC 108 via signal paths 116 and 118, respectively. Moreover, the demodulator 110 is in signal communication with the HSC 108 and the pulse measurement circuit 112 via signal paths 120 and 122, respectively.

In this example, the antenna 102 is an ultra-wideband antenna and the RF conditioner circuit 104 includes a wideband low-noise amplifier ("LNA") and a multi-channel wideband RF channelizer. In this example, the RF conditioner circuit 104 is an analog RF device, component, circuit, or module that may include a four channel ("4-channel") wideband RF channelizer (i.e., the 4-channel wideband RF channelizer includes four channelizers) that has, for example, a bandwidth for each of the channelizers that is between 500 megahertz (MHz) and 4 gigahertz (GHz).

The ADC 106 may be a commercially available ADC. The demodulator 110 is a demodulator that performs a selection function on the resulting output from the HSC 108. In this example, the demodulator 110 selects two channels for further processing out of all available channels in the HSC 108 based on a signal detection result in each channel. In this example, the demodulator 110 may include a signal detector that utilizes an envelope detection process based on the energy measurement of the output of the corresponding channel. The pulse measurement circuit 112 is circuit, device, component, or module that produces pulse description words 124 from the sampled time series produced in the selected channels.

It is appreciated by those skilled in the art that the circuits, components, modules, and/or devices of, or associated with, the ultra-wideband RF receiver 100 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In this example, the HSC 108 is a digital channelizer that utilizes neuromorphic processing and a plurality of IIR channelizer filters. Furthermore, in this example, each IIR channelizer filter of the plurality of IIR channelizer filters is configured to select a frequency band from an input signal to the HSC 108 and, in response, provide synchronous filtering of the input signal to produce sampled time series that is passed to the pulse measurement circuit 112.

In this disclosure, the ultra-wideband RF receiver 100 may be implemented on a single IC having an IC input 136 at the RF conditioner circuit 104. The IC may be implemented, for example, as a digital signal processor ("DSP"), an application specific integrated circuit ("ASIC"), or a field-programmable gate array ("FPGA"). Alternatively, the HSC 108 may also be expanded to be a single IC that includes the functional HSC portion, as a part of the IC, and one or more of the other elements (i.e., the RF conditional circuit 104, ADC 106, demodulator 110, and/or pulse measurement circuit 112).

In an example of operation, the ultra-wideband RF receiver 100 receives a plurality of input signals 126 at the antenna 102 that are input into the IC input 136 of the RF conditioner circuit 104 via signal path 114. The plurality of input signals 126 are analog RF signals and the RF conditioner circuit 104 "conditions" the received plurality of input signals 126 by amplify the plurality of input signals 126 with one or more LNAs (not shown) and channelizing the plurality of input signals 126 with (in this example) with the 4-channel wideband RF channelizer into four channels, where each of the channels has between 500 MHz and 4 GHz bandwidth. The resulting RF channeled input signals 128 are then passed to the ADC 106 via signal path 116. Once received by the ADC 106, the sampled RF signals of the RF channeled input signal 128 are converted to digital signals (i.e., digital RF channeled input signals 130) that are then passed to the HSC 108 via signal path 118. The HSC 108 then receives the digital RF channeled input signals 130 and further channelizes each of the four channeled signals into N digital sub-channels such that in this example the HSC 108 would produce 4N digital sub-channels from the four channels of the received digital RF channeled input signals 130. Each of these 4N digital sub-channels corresponds to a frequency band related to the bandwidth of the plurality of input signals 126. The HSC 108 then utilizes the parallel neuromorphic processor architecture to select a plurality of frequency bands from the digital RF channeled input signals 130 that correspond to the RF channeled input signal 128. The HSC 108 then synchronously filters the digital RF channeled input signals 130 utilizing the selected plurality of frequency bands and passes the resultant signals 132 to the demodulator 110 via signal path 120.

The demodulator 110 performs a selection function on the resulting output (i.e., resultant signals 132) from the HSC 108 and selects two channels for further processing out of all available channels in the HSC 108 based on a signal detection result in each channel. The demodulator 110 may include a signal detector that utilizes an envelope detection process based on the energy measurement of the output of the corresponding channel. The HSC 108 produces the resultant signals 132 based on trainable readouts from the parallel neuromorphic processor architecture that may assist the demodulator 110 in performing the selection function. Alternatively, the HSC 108 may perform the selection function within the HSC 108 and pass the selected two channels to the demodulator 110 for demodulation. Moreover, in another alternative, the demodulator 110 may be a part of the HSC 108 incorporating the combined functions previously described. The demodulation then produces demodulated signals 134 that are sampled time series signals produced in the selected channels and passes the demodulated signals 134 to the pulse measurement circuit 112 via signal path 122. The pulse measurement circuit 112 then produces the pulse description words 124 from the demodulated signal 134.

In general, the HSC 108 provides a major improvement over known digital channelizers in size, weight, and power consumption. As disclosed, the HSC 108 can: tolerate realistic hardware constraints, such as feedback loop delay and delays in the feedforward paths; enable massively parallel implementations of high quality IIR filters; enable signal processing with higher throughput rate than the clock speed of the digital processor; and enable flexible hardware designs tailored to the specific hardware type of implementation of HSC 108, i.e., a FPGA and ASIC. In order to accomplish this, the HSC 108 includes a parallel neuromorphic processor architecture that is configured to perform the neuromorphic processing. In this example, the parallel neuromorphic processor architecture is a reservoir computer that may be an echo state network or liquid-state machine. The reservoir computer includes a reservoir and a plurality of trainable readouts. In general, the reservoir computer is an adaptable state space filter having a plurality of reservoir connectivity matrix weights, plurality of input layer weights, and a plurality of output layer weights which will be described in greater detail later.

As an example of comparison between the HSC 108 and a conventional digital channelizer, the RF channelizers are again assumed to have a bandwidth for each of the channelizers that is between 500 MHz and 4 GHz and the ADC 106 is assumed to have a 4 GHz bandwidth 8-bit resolution.

In an example of a conventional architecture for digital channelizer being substituted for the HSC 108 in the ultrawideband RF receiver 100, the conventional digital channelizer may be a 1 by N digital channelizer that includes of N 80 MHz bandwidth 384-tap digital finite impulse response ("FIR") filters followed by an additional tapped delay line processor that implements a 128 real point fast Fourier transform ("FFT"). As such, in this example, each channel in the conventional digital channelizer performs a filtering operation and an FFT operation.

For the purpose of illustration, if the convention digital channelizer is a VIRTEX 7 FPGA module produce by Xilinx, Inc. of San Jose, Calif., the estimated power consumption for each 80 MHz bandwidth 384-tap digital FIR filter and FFT processor channel is approximately 5 W. Based on this estimate, the total power consumption for the 6-channel and 48-channel channelizers is approximately 30 W and 240 W, respectively.

Figure 2:
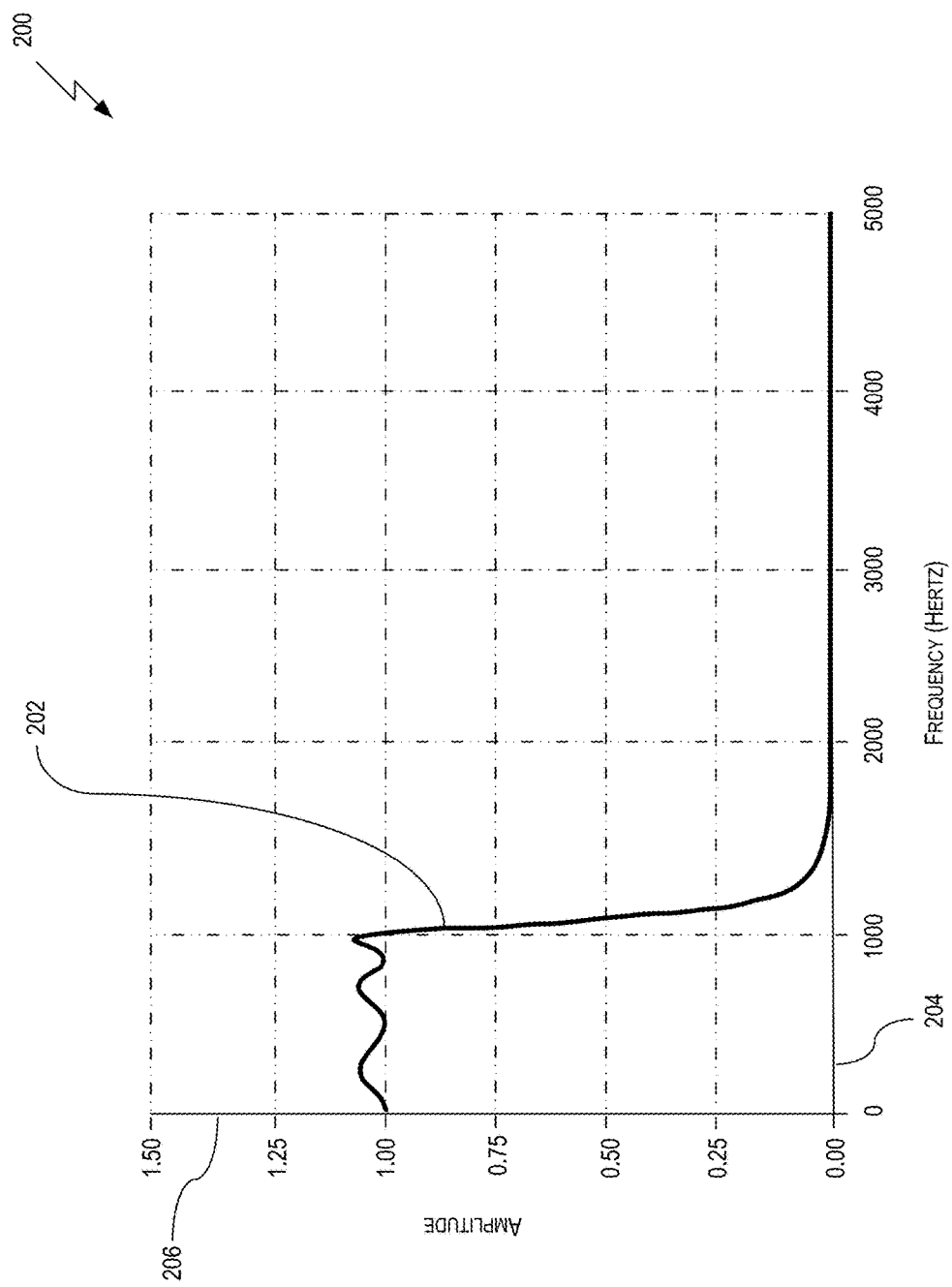
FIG. 2 is a plot of an example of an implementation of an analog IIR filter in accordance with the present disclosure.
Figure 3:
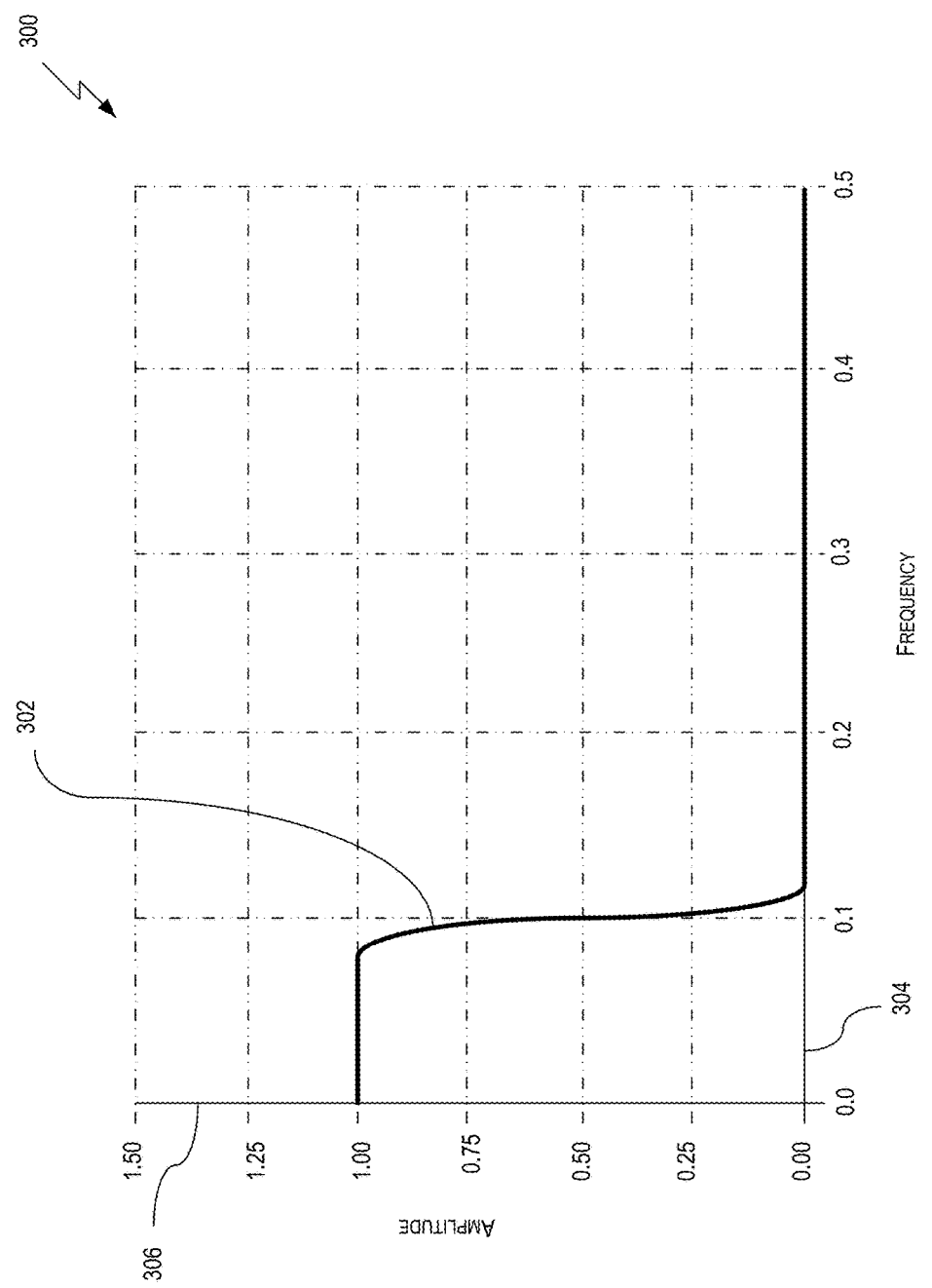
FIG. 3 is a plot of an example of an implementation of a digital FIR filter.

This is significantly higher than the estimated power consumption of the presently disclosed HSC 108 that utilizes high quality IIR filters instead of FIR filters utilized by conventional digital channelizers. The reason for this is that the HSC 108 utilizes IIR filters that are directly derived from analog filters and utilize much less numbers of computing nodes (i.e., poles/zeros) than the equivalent performance tapped delay line FIR filters. As an example, in FIG. 2, a plot 200 of an example of an implementation of an analog IIR filter is shown in accordance with the present disclosure. In this example, the analog IIR filter has a frequency response that includes a transfer function 202 that is plotted along the frequency axis 204 (in Hertz) and the amplitude axis 206, where the frequency axis 204 ranges from 0 to 5,000 Hertz and the amplitude axis 206 ranges from 0.00 to 1.50. In this example, the transfer function 202 corresponds to the frequency response of an analog 6-pole Chebyshev filter. In comparison, in FIG. 3 a plot 300 is shown of the frequency response of an example of an implementation of a digital FIR filter. In this example, the digital FIR filter is a digital 129-tap windowed-sinc filter. Similar to the plot 200 of FIG. 2, the plot 300 of FIG. 3 includes a frequency axis 304 and the amplitude axis 306, where the frequency axis 304 ranges from 0.0 to 0.5 and the amplitude axis 306 ranges from 0.00 to 1.50.

In comparing both frequency response, it is evident that the transfer function 202 of the analog IIR filter is similar to the transfer function 302 of the digital FIR filter; however, in this example the analog IIR filter has 6 poles which is significantly less than the 129 tops for the digital FIR filter. As a result, the analog IIR filter has a significant power savings as compared to the digital FIR filter with similar performance.

It is appreciated by those of ordinary skill in the art that typical filter performance is characterized by achievable filter transfer functions, out-of-band rejection, passband and/or out-of-band ripples, passband phase linearity, and repeatability. As such, the IIR filters described in the present disclosure are directly derived from analog pole-zero filters, can achieve broader classes of filter transfer functions than that of digital FIR filters, and are stable by design because they implement passive state space filters that are unconditionally stable. In this disclosure, the IIR filter transfer functions are designed utilizing delay differential equations ("DDEs") instead of ordinary differential equation ("ODEs").

Moreover, in general an expanding on the earlier description, the HSC 108 is a device, component, circuit, or module that utilizes a real-time neuromorphic signal processing approach that utilizes reservoir computing that may be configured to perform a massive parallel IIR filtering function that is implementable within an IC that may be, for example, a DSP, FPGA, and ASIC. The HSC 108 utilizes an ordinary differential equation to delayed transformation to map the IIR filtering process onto a massively parallel neuromorphic processor architecture. As a result, this IIR filtering design can tolerate realistic hardware constraints, such as, for example, feedback loop delay and delays in the feedforward paths. Additionally, this IIR filtering design also allows the utilization of an arbitrary number of pipeline stages in each multiplier and summing junction in the implemented hardware IC. In this disclosure, each IIR filter of multiple channels (i.e., each IIR channelizer filter) may implement an elliptic transfer function, quasi-elliptic transfer function, or phase-equalized elliptic transfer function.

Again, in this disclosure the HSC 108 utilizes neuromorphic processing in implementing the IIR filters. Neuromorphic computing (also known as neuromorphic engineering) utilizes very-large-scale integration ("VLSI") systems that include software and/or electronic circuits to mimic neurobiological architectures present in the nervous system. Since in the present disclosure, the HSC 108 operates on parallel channels of information produced by the RF conditioner circuit 104 and ADC 106, the HSC 108 utilizes a parallel neuromorphic processor architecture that is implemented as a reservoir computer.

It is appreciated by those of ordinary skill in the art that reservoir computing is a paradigm for computation that is a type of recurrent neural network. In general, reservoir computing outperforms existing algorithms in key cognitive signal processing tasks that include, for example, chaotic time series prediction, speech recognition on small vocabulary and digit recognition.

A reservoir computer is a device that utilizes reservoir computing and includes a reservoir and readout mechanism. The reservoir is a random dynamical system that includes randomly connected linear/nonlinear computing nodes. The reservoir projects (i.e. maps) the input to reservoir computer into a high dimensional state space of the reservoir that forms an equivalent dynamical model of the signal generation process. The dynamic state space model captures all the available/actionable information about the inputs. The readout mechanism is a plurality of trainable readouts that are trained readout layers (both off-line and on-line). The trained readout layers learn the desired outputs (e.g., the signal and behavior classes, predicted values, features, anomalies, separated signals, de-noised input, etc.) by utilizing reservoir state functions of the reservoir. One of the benefits of reservoir computing is that the raining is performed only at the readout stage (Le the plurality of trainable readouts) and the reservoir is fixed. Examples of reservoir computing systems (i.e., reservoir computers) includes liquid-state machines and echo state networks ("ESNs").

In the case of an ESN, the ESN is, in general, a recurrent neural network with a sparsely connected hidden layer of nodes known as "neurons." The connectivity and weights of hidden neurons within the ESN are fixed and randomly assigned and the weights of output neurons can be learned such that the ESN can produce, or reproduce, specific temporal patterns. As a result, although the behavior of an ESN is non-linear, the only weights that are modified during training are for the synapses that connect the hidden neurons to output neurons. Thus, the error function of an ESN is quadratic with respect to the parameter vector and can be differentiated to a linear system.

Figure 4:
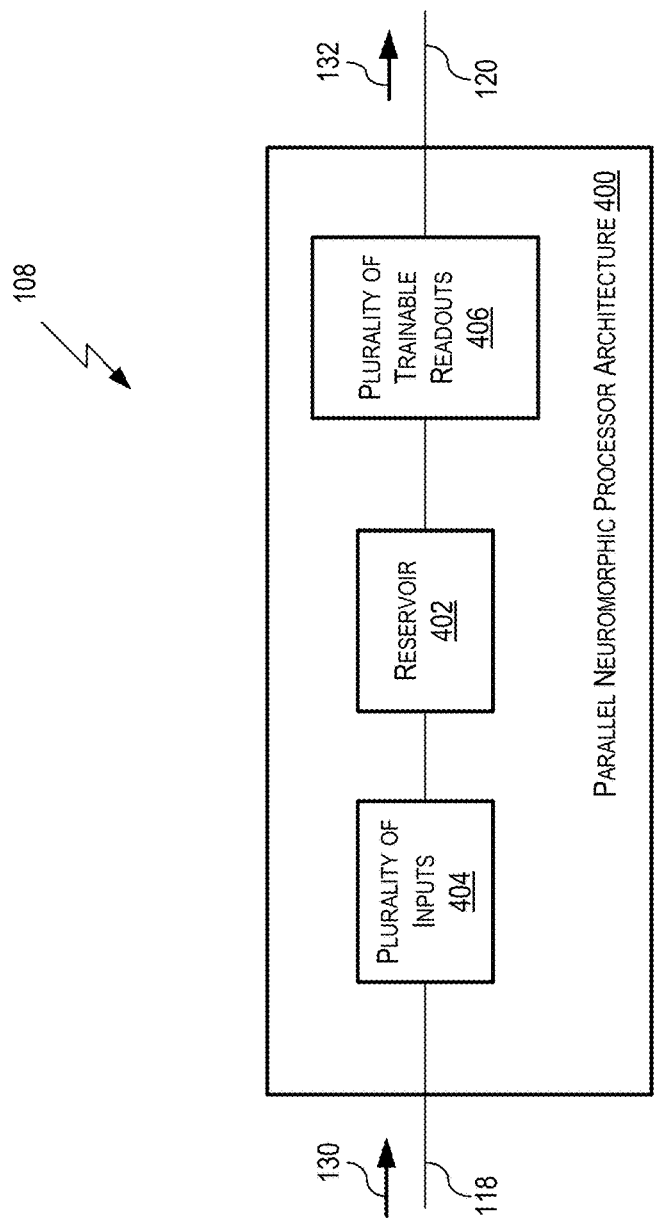
FIG. 4 is a block diagram of an example of an implementation of a neuromorphic architecture within a hardware scalable channelizer ("HSC") in accordance with the present disclosure.

As such, in FIG. 4, a block diagram of an example of an implementation of a parallel neuromorphic processor architecture 400 within the HSC 108 is shown in accordance with the present disclosure. In this example, the parallel neuromorphic processor architecture 400 is a reservoir computer that includes a reservoir 402, a plurality of inputs 404, and a plurality of trainable readouts 406. In this example, the reservoir computer has computing nodes and is, or is related to, a nonlinear state space filter. Additionally, the reservoir computer has a plurality of reservoir connectivity nodes organized as a matrix in the reservoir 402. As such, the reservoir computer is organized to form an adaptable state space filter having a plurality of reservoir connectivity matrix weights within the reservoir 402, plurality of input layer weights at the plurality of inputs 404, and a plurality of output layer weights at the plurality of trainable readouts 406.

In this example, if first order linear dynamics for each computing node is assumed, the reservoir 402 implements a connection matrix that defines the filter poles. The output layer (i.e., the plurality of trainable readouts 406) along with the input (i.e., the plurality of inputs 404) then define the filter zeros. As a result, the filter adaptation of the reservoir computer is achieved by adapting both the plurality of trainable readouts 406 and the reservoir 402 connection matrix.

Figure 5:
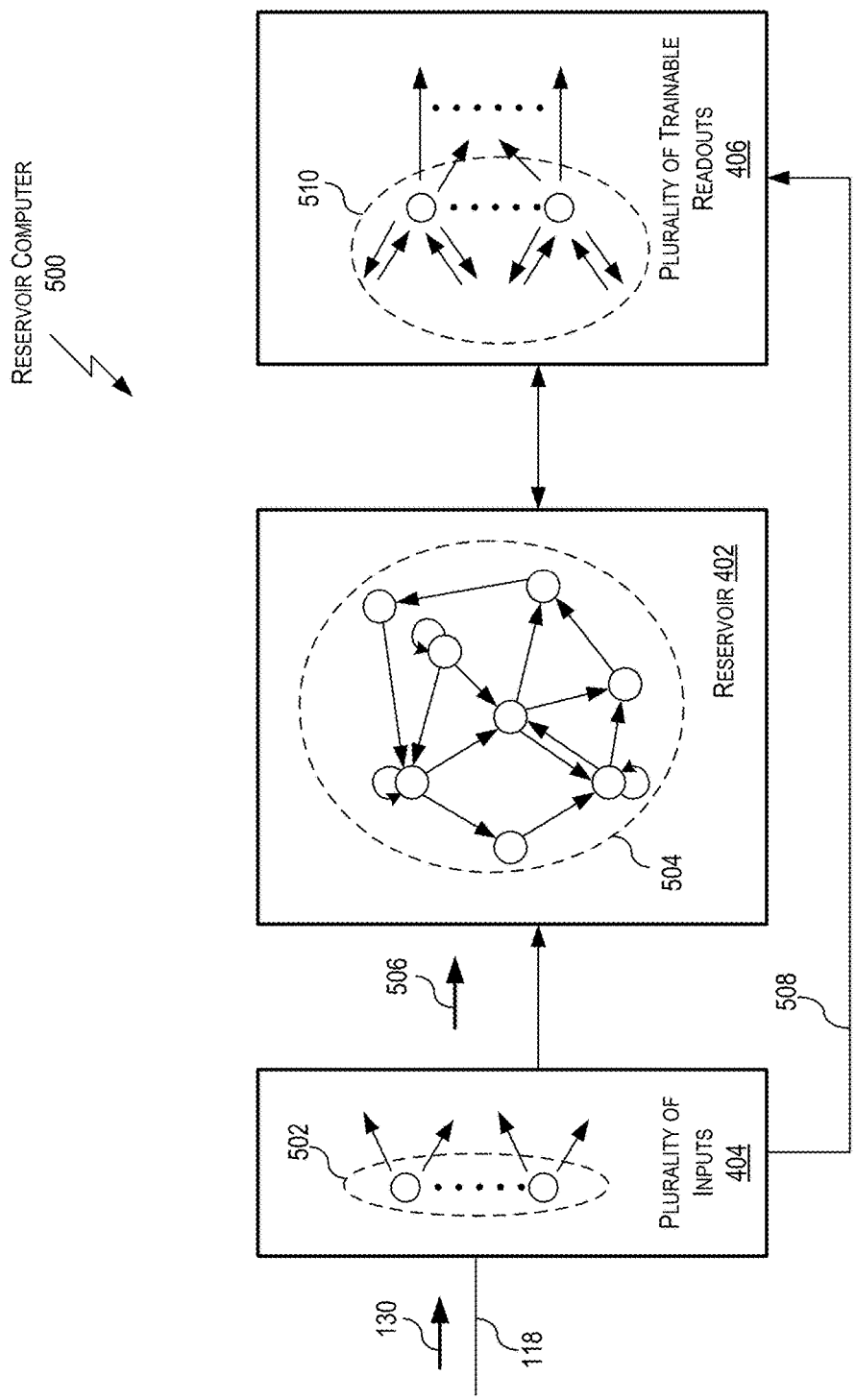
FIG. 5 is a block diagram of an example of an implementation of state machines for the reservoir computer of the HSC in accordance with the present disclosure.

In FIG. 5, a block diagram of an example of an implementation of state machines are shown for the reservoir computer 500 of the HSC 108 in accordance with the present disclosure. In this example the plurality of inputs 404 includes a plurality of input nodes 502 that pass the digital RF channeled input signals 130 to the reservoir 402. The reservoir 402 includes a plurality of state notes 504 that process the inputs 506 provided by the plurality of input nodes 502 and the plurality of trainable readouts 406 includes a plurality of trained readout layer nodes 510 that learn the desired outputs by utilizing the reservoir 402 state functions. In this example, some of the inputs 508 from the plurality of inputs 404 may be passed directly to the trained readout layer nodes 510 based on the reservoir state functions.

Figure 6:
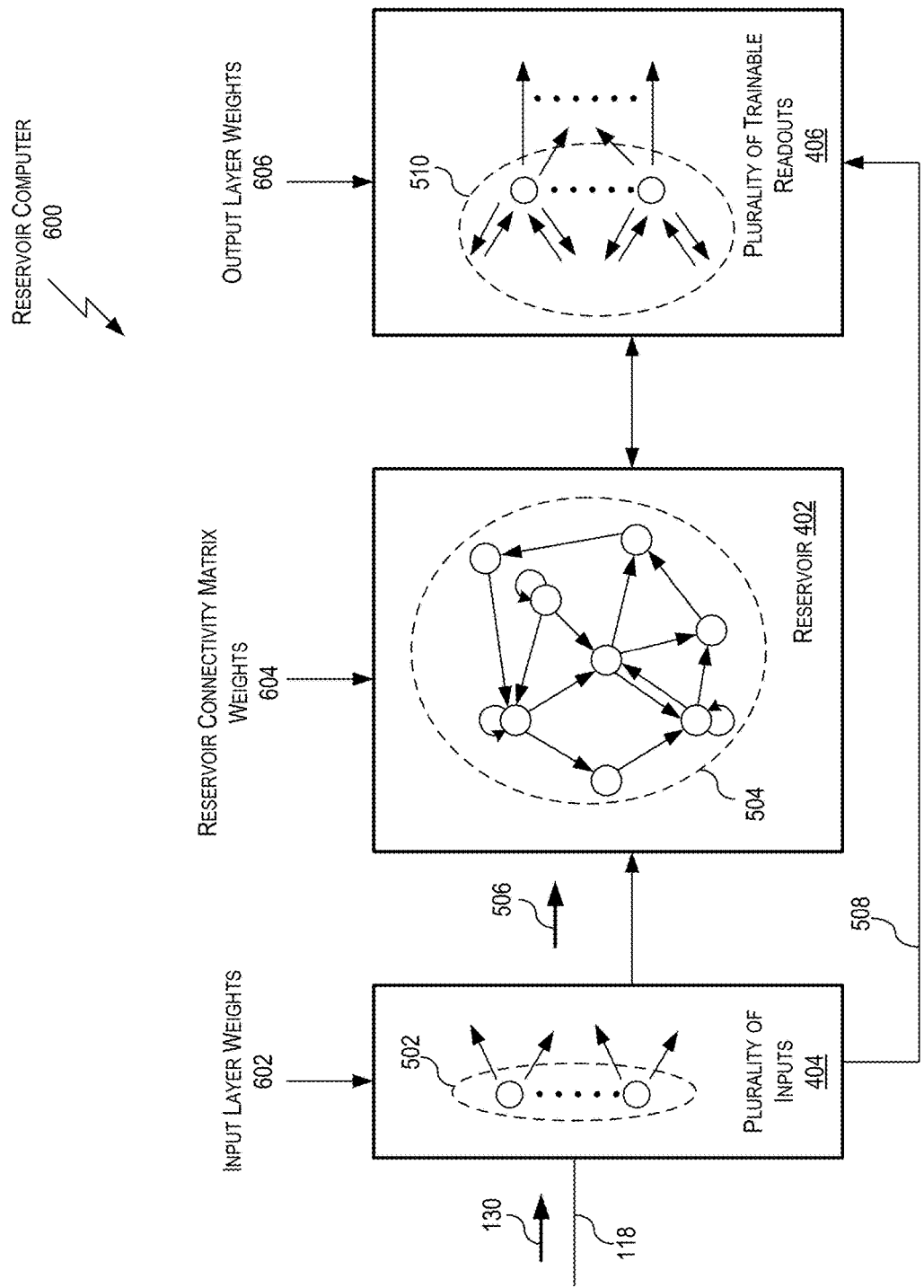
FIG. 6 is a block diagram of an example of an implementation of a reservoir computer as an adaptable nonlinear state space filter in accordance with the present disclosure.

Turning to FIG. 6, a block diagram of an example of an implementation of a reservoir computer 600 as an adaptable nonlinear state space filter is shown in accordance with the present disclosure. In this example, the reservoir computer 600 (similar to the example in FIG. 5) includes the reservoir 402, the plurality of inputs 404, and the plurality of trainable readouts 406 similar to the example shown in FIG. 5. However, in this example, the reservoir computer 600 receives input layer weights 602 at the plurality of inputs 404, reservoir connectivity matrix weights 604 at the reservoir 402, and output layer weights 606 at the plurality of trainable readouts 406. In this example, if the reservoir computer 600 is an ESN, the state functions of the reservoir 402 are represented by uniform time sampled analog waveforms and the states and output, or outputs, are updated at sample times that are typically driven by a clock (not shown). In general, ESN based signal processing and computing requires various iterative maps that govern the state update, weights adaptation, and output generation. As such, in this disclosure computing nodes are utilized with first order dynamics described by first order ODEs. The resultant system of ODEs (i.e., the reservoir dynamic) is converted into an iterative map via converting the ODEs into DDEs using matrix exponentials.

For a reservoir 402 with a plurality of state notes 504 that are linear computing nodes, the resultant system of DDEs enables the implementation of arbitrary feedback delays for the hardware implementations. The DDEs also enable effective parallelization of the state update equations and learning processes for adapting the output layer weights 606.

In this example, the relationship between the digital RF channeled input signals 130, resultant signal 132, input layer weights 602, reservoir connectivity matrix weights 604, and output layer weights 606 (i.e., the filter dynamics) may be described by the following relationships of the two ODEs $\dot{x}(t)=\underline{A}x(t)+\underline{B}u(t)$ and $y(t)=\underline{C}(x(t))^T\underline{x}(t)+Du(t)$. In this example, "u" represents the input signal as a function of time ("t"), "y" represents the output signal as a function of time, "x" represents a vector of state values of the adaptable state space filter as a function of time, "$\dot{x}(t)$" represents a first derivative of x, "$\underline{A}$" represents a matrix of the reservoir connectivity matrix weights 604, "$\underline{B}$" represents a vector of weight values of input layer weights 602, and "$\underline{C}$" and "$\underline{D}$" represent two vectors of weight values of output layer weights 606.

These ODEs may be replaced with the following equivalent DDEs $$x(t) = e^{A\tau}x(t-\tau) + \int_{t-\tau}^{t} e^{A(t-s)}u(s)ds \cdot \underline{B}$$

and $$y(t)=\underline{C}x(t)+Du(t)$$

that describe the same filter dynamics as the ODEs. In this example, τ is delay time value for the filter and s is the integration variable representing the range of values from t−τ to τ. Based on this form of the DDE of the state update equation, any feedback delay value τ may be utilized in the DDE to update the filter state values of $\underline{x}$; however, use of a longer feedback delay value τ requires more parallel calculations since, according to the DDE, there is a need to integrate the input u(s) from the current minus delay time point (i.e., t−τ) to the current time t.

Therefore, in this disclosure, the DDE for x(t) (i.e., the update equation) is discretized utilizing the actual sample time interval associated with the clock speed of the digital processor on the IC producing a discrete update equation that is as follows:

$$\underline{x}_i = e^{\Delta \tau} \underline{x}_{i-n_e} + [\underline{B}^1_{1e}, \underline{B}^1_{2e}, \ldots, \underline{B}^{n_e}_{1e}, \underline{B}^{n_e}_{2e}] \begin{bmatrix} u_i \\ u_{i-1} \\ u_{i-2} \\ \ldots \\ u_{i-n_e-1} \\ u_{i-n_e} \end{bmatrix}.$$

Figure 7A:
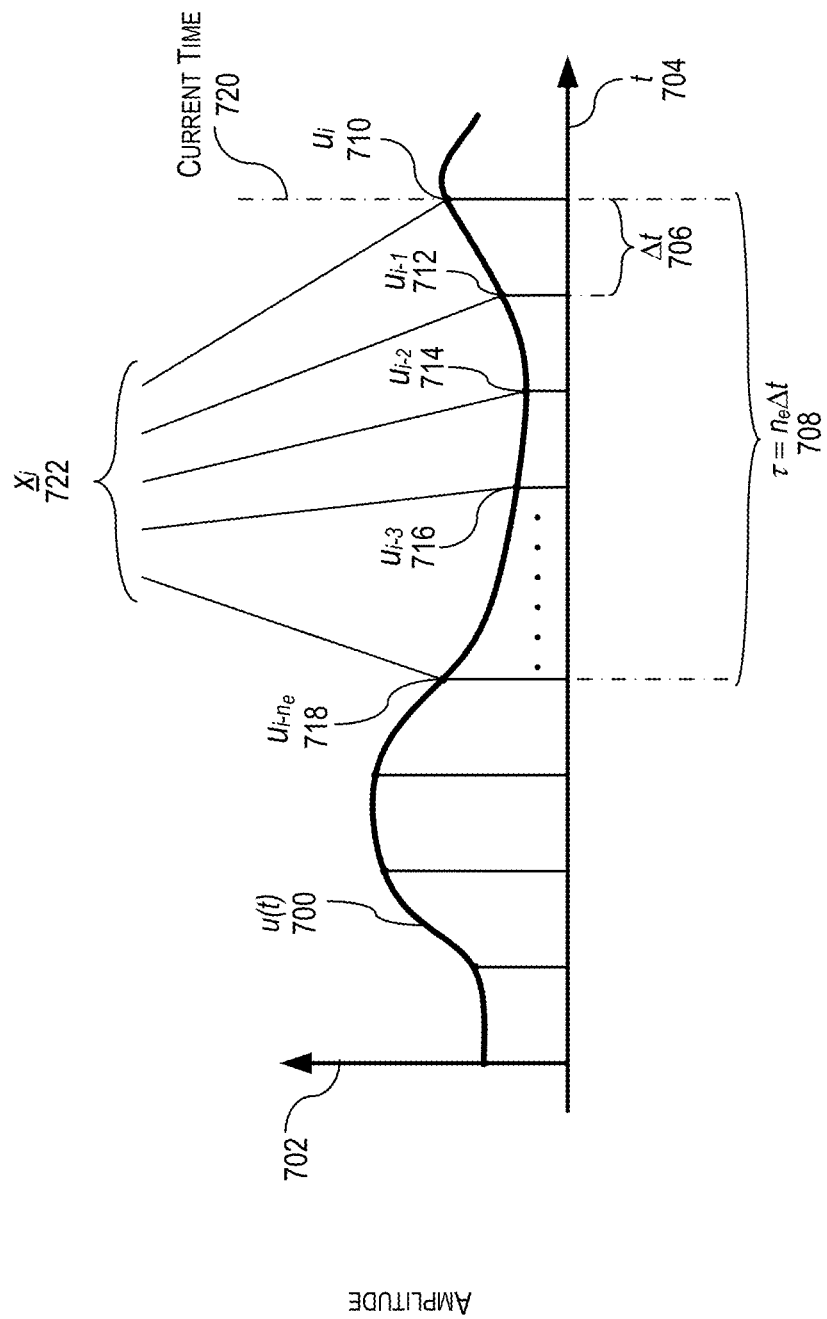
FIG. 7A is a system diagram of an example of an implementation of a discretized delay differential equation ("DDE") update equation for x(t) in accordance with the present disclosure.

As such, in FIG. 7A, a system diagram is shown of an example of an implementation of the discretized DDE update equation for x(t) in accordance with the present disclosure. In this example, a plot of the input signal u(t) 700 is shown along an amplitude axis 702 and time axis 704. In this example, the input signal u(t) 700 is sampled at a sampling rate that has a sampling period Δt 706 based on the clock frequency of the system. The feedback delay value τ708 is equal to the sampling period Δt 706 multiplied by the number of delay samples $n_e$, where the feedback delay value τ708 is a time window to be processed by the system. In this example, the input signal is sampled at time ("t") equals i, i−1, i−2, i−3, and i−$n_e$ producing sampled values $u_i$ 710, $u_{i-1}$ 712, $u_{i-2}$ 714, $u_{i-3}$ 716 and $u_{i-n_e}$ 718, where the current time 720 is at i equals zero. The sampled values $u_i$ 710, $u_{i-1}$ 712, $u_{i-2}$ 714, $u_{i-3}$ 716 and $u_{i-n_e}$ 718 are then combined to form the discrete filter state values of discrete vector $\underline{x}_i$ 722, which is utilized in the discrete update equation described earlier for $\underline{x}_i$ 722.

Similarly, in this disclosure, the DDE for y(t) is also discretized utilizing the actual sample time interval associated with the clock speed of the digital processor on the IC producing a discrete equation that is as follows:

$$\underline{y}_i = \underline{C} e^{\Delta n_e \Delta \tau} \underline{x}_{i-n_e} + \underline{C}[\underline{B}^1_{1e}, \underline{B}^1_{2e}, \ldots, \underline{B}^{n_e}_{1e}, \underline{B}^{n_e}_{2e}] \begin{bmatrix} u_i \\ u_{i-1} \\ u_{i-2} \\ \ldots \\ u_{i-n_e-1} \\ u_{i-n_e} \end{bmatrix} + D u_i.$$

Figure 7B:
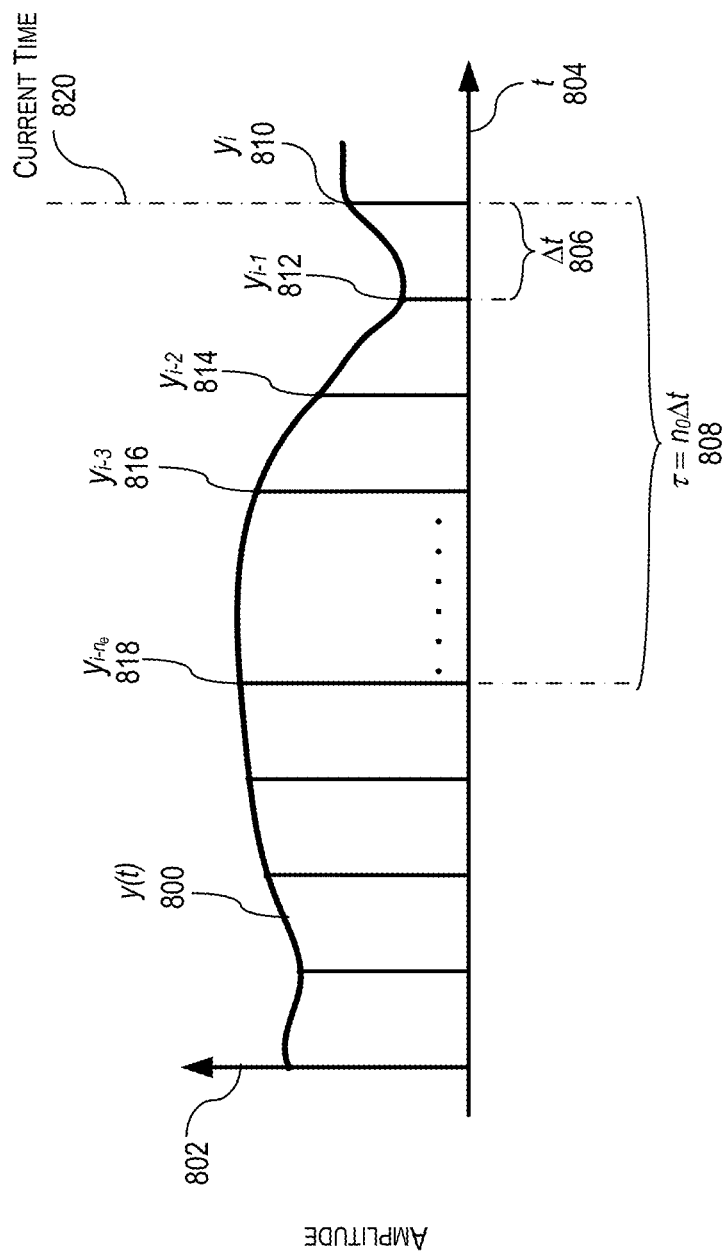
FIG. 7B is a system diagram of an example of an implementation of a discretized DDE output equation for y(t) in accordance with the present disclosure.

As such, in FIG. 7B, a system diagram is shown of an example of an implementation of the discretized DDE output equation for y(t) in accordance with the present disclosure.

In this example, a plot of the output signal y(t) 800 is shown along an amplitude axis 802 and time axis 804. In this example, the output signal y(t) 800 is again sampled at a sampling rate that has a sampling period Δt 806 based on the clock frequency of the system.

Again, the feedback delay value τ808 is equal to the sampling period Δt 806 multiplied by the number of delay samples $n_e$, where the feedback delay value τ808 is the time window to be processed by the system. In this example, the input signal is sampled at time ("t") equals i, i−1, i−2, i−3, and i−$n_e$ producing sampled values $y_i$ 810, $y_{i-1}$ 812, $y_{i-2}$ 814, $y_{i-3}$ 816 and $y_{i-n_e}$ 818, where the current time 820 is at i equals zero.

In this example, it is assumed that the input sample rate (i.e., the inverse of the sampling period Δt 706 or 806) is equal to the clock speed of the digital processor. The output signal y(t) 800 is then determined from the updated state values $x_i$ and the most current input sample $u_i$. Arbitrary feedforward delay values can be incorporated into the output update equation since there is no feedback connection in this part of the circuit. As such, the design can tolerate arbitrary feedforward and feedback delays enabling high speed operation via advanced design techniques such as pipelining and asynchronous digital design.

As an example of an implementation of the HSC 108 in a commercially available FPGA, a synchronous 1-to-2 channel channelizer may be designed for implementation on a VIRTEX-7 FPGA produced by Xilinx, Inc. of San Jose, Calif. In this example, the channelizer consists of two parallelized, 10-pole elliptic state-space IIR filters. The input to the channelizer is a vector of 4, 12-bit samples (as interpreted in fixed-point Q0.11 format) every 11.11 ns (i.e., at 90 MHz) for a total input sampling rate of 360 million or mega samples per second (Msps). The output of the filter is a vector of 4, 16-bit samples (as interpreted in fixed-point Q1.14 format) every 11.11 ns (i.e., at 90 MHz) for a total output rate of 360 Msps.

The maximum bandwidth of an input signal that can be filtered with this design is therefore 180 MHz. Channel 1 has a passband from 80-85 MHz, and channel 2 has a passband from 85-90 MHz. In this example, the 5 MHz passbands are quite narrow with only 2.8% bandwidth relative to the Nyquist rate. Furthermore, in this example, both filters exhibit approximately 1 decibel (dB) in-band ripple and each has a noise floor of −70 dB. The transition bands of both filters are also very narrow −70 dB where out-of-band rejection (for the maximum) is achieved only 3.5 MHz away from the passband edges and 20 and 40 dB rejection is achieved only about 0.5 and 1.5 MHz from the passband edges, respectively.

Figure 8A:
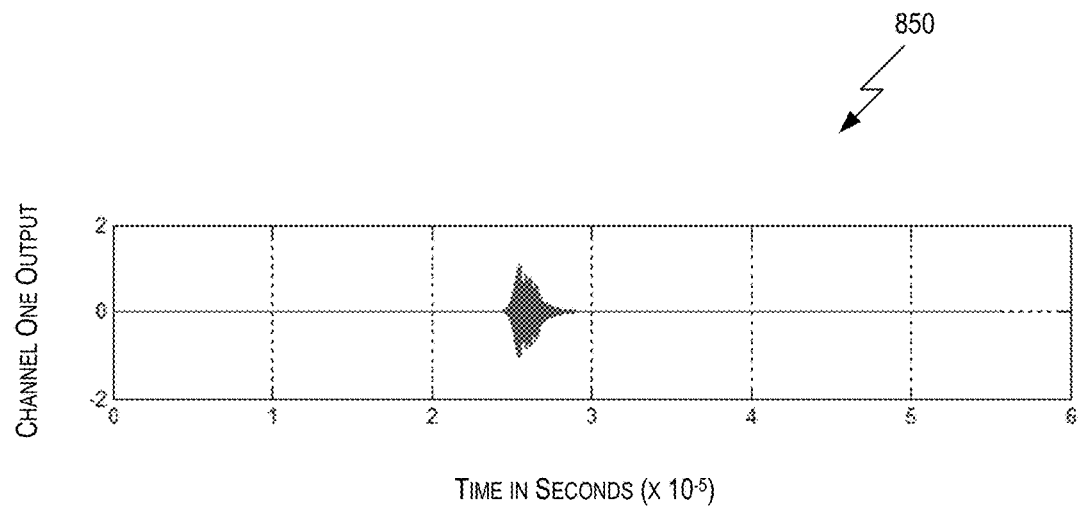
FIG. 8A is a plot of a channel one time domain response to a chirp input in accordance to the present disclosure.
Figure 8B:
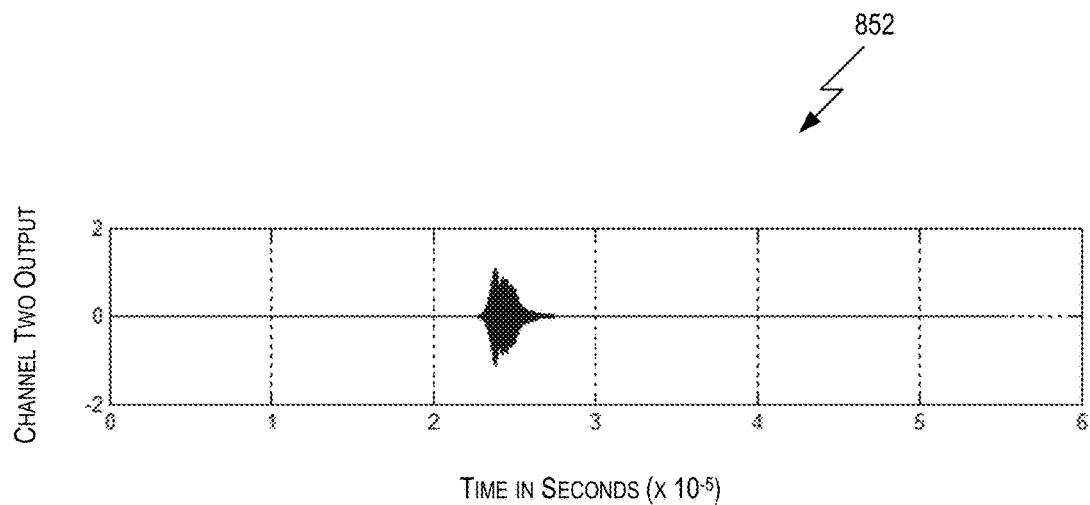
FIG. 8B is a plot of a channel two time domain response to the chirp input in accordance to the present disclosure.
Figure 8C:
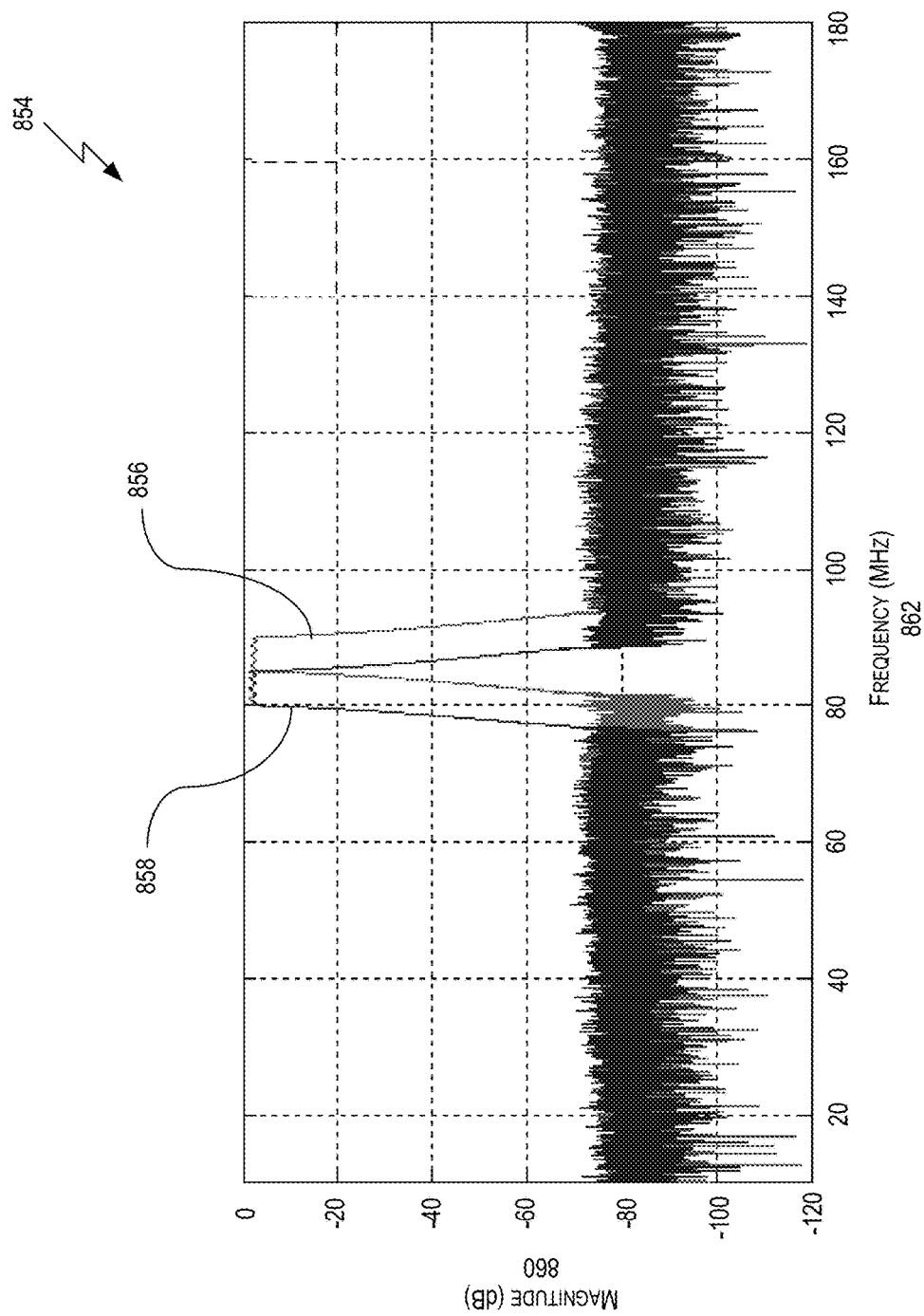
FIG. 8C is a plot of the frequency response for a channel one and a channel two for the system in accordance with the present description.

In this example, the channelizer Verilog code may be written utilizing Xilinx ISE software (for Xilinx, Inc. of San Jose, Calif.) and requires 6,426 look up tables ("LUTs") and 504 DSP48E1 multipliers on the VIRTEX-7 FPGA. The input signal may be a unity linear chirp that ranges in frequency from 8-180 MHz. As such, in FIG. 8A, a plot 850 of a channel one time domain response to the chirp input is shown in accordance to the present disclosure. In FIG. 8B, a plot 852 of a channel two time domain response to the chirp input is shown in accordance to the present disclosure. In both plots 850 and 852, the channel one output and channel two output are plotted versus time in 10 microsecond intervals (i.e., ×10$^{-5}$). In FIG. 8C, a plot 854 of the frequency response for channel one 856 and channel two 858 for the system is shown in accordance with the present description. The plot 854 is of magnitude 860 in decibels ("dB") versus frequency 862 in MHz.

Figure 9:
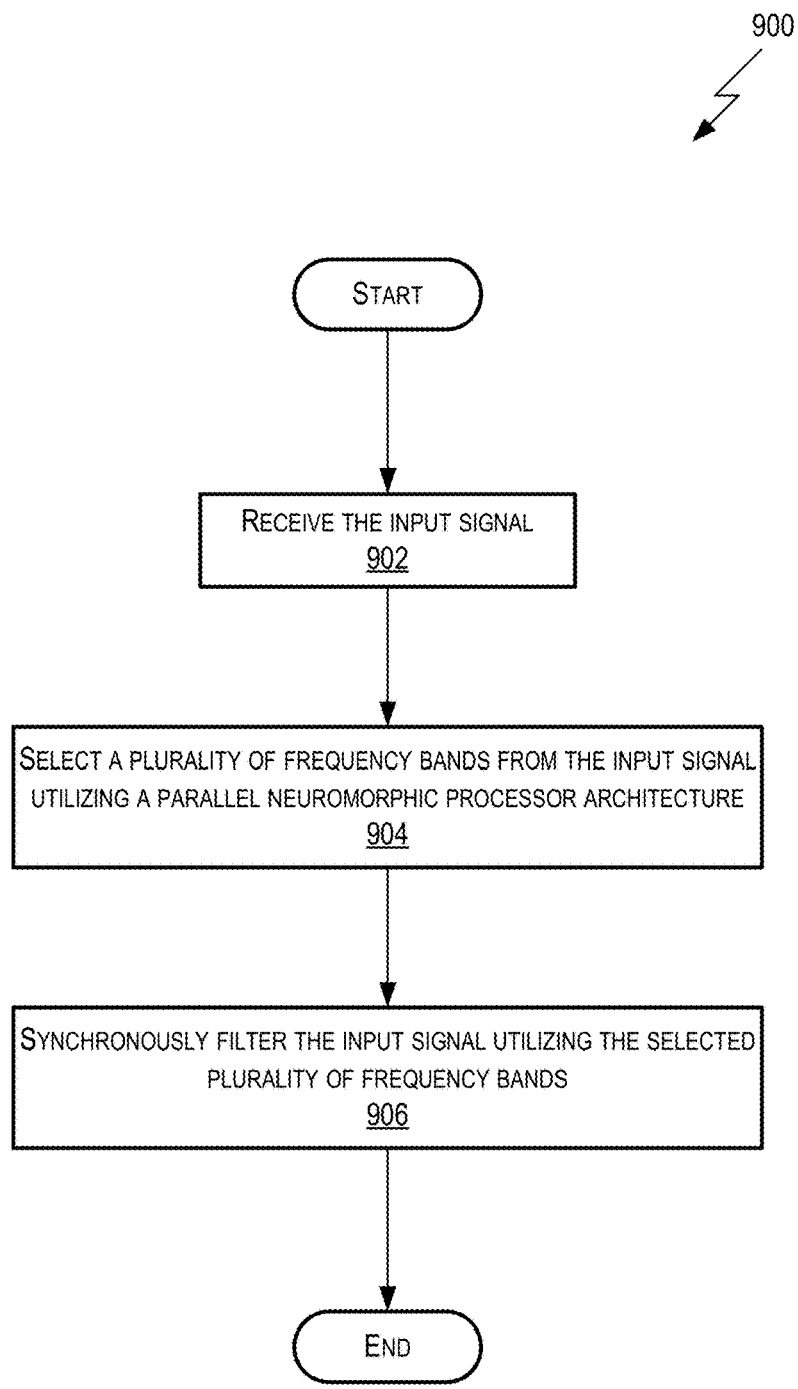
FIG. 9 is a flowchart of an example of an implementation of a method performed by the HSC in accordance with the present description.

Turning to FIG. 9, a flowchart of an example of an implementation of a method 900 performed by the HSC 108 is shown in accordance with the present description. The method starts by receiving 902 the input signal at the IC, selecting 904 a plurality of frequency bands from the input signal utilizing a parallel neuromorphic processor architecture of the HSC, and synchronous filtering 906 the input signal utilizing the selected plurality of frequency bands. The process then ends.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. A method for channelizing an input signal with an integrated circuit ("IC") having a hardware scalable channelizer ("HSC") that utilizes neuromorphic processing, the method comprising:
    receiving the input signal at the IC;
    selecting a plurality of frequency bands from the input signal utilizing a parallel neuromorphic processor architecture of the HSC,
        wherein the parallel neuromorphic processor architecture includes a reservoir computer that has a reservoir and a plurality of trainable readouts and
        wherein the reservoir computer is an adaptable state space filter having a plurality of reservoir connectivity matrix weights, plurality of input layer weights, and plurality of output layer weights; and
    synchronous filtering the input signal utilizing the selected plurality of frequency bands;
    producing an output signal from the input signal,
    wherein the output signal is described by the following relationships, $\underline{\dot{x}}(t)=\underline{A}\underline{x}(t)+\underline{B}u(t)$ and $y(t)=\underline{C}(\underline{x}(t))^T\underline{x}(t)+Du(t)$, and
    wherein "u" represents the input signal as a function of time ("t"), "y" represents the output signal as a function of time, "$\underline{x}$" represents a vector of state values of the adaptable state space filter as a function of time, "$\underline{\dot{x}}(t)$" represents a first derivative of x, "$\underline{A}$" represents a matrix of reservoir connectivity matrix weight values, "$\underline{B}$" represents a vector of weight values of input layer weights, and "$\underline{C}$" and "$\underline{D}$" represent two vectors of weight values of output layer weights.

2. The method of claim 1,
    wherein the relationships $\underline{\dot{x}}(t)=\underline{A}\underline{x}(t)+\underline{B}u(t)$, and $y(t)=\underline{C}(\underline{x}(t))^T\underline{x}(t)+Du(t)$, are described by equivalent delay relationships $$\underline{x}(t) = e^{A\tau}\underline{x}(t-\tau) + \int_{t-\tau}^{t} e^{A(t-s)}u(s)ds \cdot \underline{B},$$

and $y(t)=\underline{C}\underline{x}(t)+Du(t)$, and
    wherein "s" represents an integrating variable.

3. A hardware scalable channelizer ("HSC") comprising:
    an integrated circuit ("IC") that utilizes neuromorphic processing, the IC including
        an IC input configured to receive an input signal,
            wherein the input signal has an operating frequency and the IC has an operating bandwidth that is greater than the operating frequency of the input signal,
            wherein the IC further includes a parallel neuromorphic processor architecture that is configured to perform the neuromorphic processing,
            wherein the parallel neuromorphic processor architecture is a reservoir computer that includes a reservoir and a plurality of trainable readouts and the reservoir computer is an adaptable state space filter having a plurality of reservoir connectivity matrix weights, plurality of input layer weights, and plurality of output layer weights,
        a plurality of infinite impulse response ("IIR") channelizer filters in signal communication with the IC input,
    wherein each IIR channelizer filter of the plurality of IIR channelizer filters is configured to select a frequency band from the input signal and provide synchronous filtering of the input signal and implements an elliptic transfer function, quasi-elliptic transfer function, or phase-equalized elliptic transfer function,
    wherein the adaptable state space filter produces an output signal from the input signal that is described by the following relationships, $\underline{\dot{x}}(t)=\underline{A}\underline{x}(t)+\underline{B}u(t)$, and $y(t)=\underline{C}(\underline{x}(t))^T\underline{x}(t)+Du(t)$, and
    wherein "u" represents the input signal as a function of time ("t"), "y" represents the output signal as a function of time, "$\underline{x}$" represents a vector of state values of the adaptable state space filter as a function of time, "$\underline{\dot{x}}(t)$" represents a first derivative of x, "$\underline{A}$" represents a matrix of reservoir connectivity matrix weight values, "$\underline{B}$" represents a vector of weight values of input layer weights, and "$\underline{C}$" and "$\underline{D}$" represent two vectors of weight values of output layer weights.

4. The HSC of claim 3, wherein the IC is a digital signal processor ("DSP"), application-specific integrated circuit ("ASIC"), or field-programmable gate array ("FPGA").

5. The HSC of claim 3,
    wherein the relationships $\underline{\dot{x}}(t)=\underline{A}\underline{x}(t)+\underline{B}u(t)$, and $y(t)=\underline{C}(\underline{x}(t))^T\underline{x}(t)+Du(t)$, are described by equivalent delay relationships $$\underline{x}(t) = e^{A\tau}\underline{x}(t-\tau) + \int_{t-\tau}^{t} e^{A(t-s)}u(s)ds \cdot \underline{B},$$

and $y(t)=\underline{C}\underline{x}(t)+Du(t)$, and
    wherein "s" represents an integrating variable.

6. The HSC of claim 3, wherein the reservoir computer is an echo state network or a liquid-state machine.

7. The HSC of claim 3, further including an analog-to-digital converter in signal communication with the IC.

8. The HSC of claim 7, wherein the IC includes the analog-to-digital converter.

9. The HSC of claim 8, further including a radio frequency conditioner.

10. The HSC of claim 8, further including a demodulator.

11. The HSC of claim 10, further including a pulse measurement circuit.

12. An integrated circuit ("IC") comprising:
- an IC input configured to receive an input signal wherein the input signal has an operating frequency and the IC has an operating bandwidth that is greater than the operating frequency of the input signal; and
- a hardware scalable channelizer ("HSC") that utilizes neuromorphic processing, the HSC including
  - a parallel neuromorphic processor architecture that is configured to perform the neuromorphic processing, wherein the parallel neuromorphic processor architecture is a reservoir computer that includes a reservoir and a plurality of trainable readouts and the reservoir computer is an adaptable state space filter having a plurality of reservoir connectivity matrix weights, plurality of input layer weights, and plurality of output layer weights, and
  - a plurality of infinite impulse response ("IIR") channelizer filters in signal communication with the IC input,
- wherein each IIR channelizer filter of the plurality of IIR channelizer filters is configured to select a frequency band from the input signal and provide synchronous filtering of the input signal and implements an elliptic transfer function, quasi-elliptic transfer function, or phase-equalized elliptic transfer function, wherein the adaptable state space filter produces an output signal from the input signal that is described by the following relationships, $\dot{\underline{x}}(t)=\underline{A}\underline{x}(t)+\underline{B}u(t)$, and $y(t)=\underline{C}(\underline{x}(t))^T\underline{x}(t)+Du(t)$, and wherein "u" represents the input signal as a function of time ("t"), "y" represents the output signal as a function of time, "$\underline{x}$" represents a vector of state values of the adaptable state space filter as a function of time, "$\dot{\underline{x}}(t)$" represents a first derivative of x, "$\underline{A}$" represents a matrix of reservoir connectivity matrix weight values, "$\underline{B}$" represents a vector of weight values of input layer weights, and "$\underline{C}$" and "$\underline{D}$" represent two vectors of weight values of output layer weights.

13. The IC of claim 12, wherein the IC is a digital signal processor ("DSP"), application-specific integrated circuit ("ASIC"), or field-programmable gate array ("FPGA").

14. The IC of claim 12,
wherein the relationships $\dot{\underline{x}}(t)=\underline{A}\underline{x}(t)+\underline{B}u(t)$, and $y(t)=\underline{C}(\underline{x}(t))^T\underline{x}(t)+Du(t)$, are described by equivalent delay relationships $$\underline{x}(t) = e^{\underline{A}\tau}\underline{x}(t-\tau) + \int_{t-\tau}^{t} e^{\underline{A}(t-s)}u(s)ds \cdot \underline{B},$$

and $y(t)=\underline{C}\underline{x}(t)+Du(t)$, and
wherein "s" represents an integrating variable.

15. The IC of claim 12, wherein the reservoir computer is an echo state network or a liquid-state machine.

16. The IC of claim 12, further including an analog-to-digital converter in signal communication with the IC.

17. The IC of claim 16, further including a radio frequency conditioner.

18. The IC of claim 16, further including a demodulator.

19. The IC of claim 16, further including a pulse measurement circuit.

* * * * *

UNITED STATES PATENT AND TRADEMARK OFFICE
CERTIFICATE OF CORRECTION

| | | |
|---|---|---|
| PATENT NO. | : 10,211,856 B1 | Page 1 of 1 |
| APPLICATION NO. | : 15/782815 | |
| DATED | : February 19, 2019 | |
| INVENTOR(S) | : Peter Petre et al. | |

It is certified that error appears in the above-identified patent and that said Letters Patent is hereby corrected as shown below:

In the Claims

Column 12, Line 8:

$$\underline{x}(t) = e^{\underline{A}\tau}\underline{x}(t-\tau) + \int_{t-\tau}^{t} e^{\underline{A}(t-s)} u(s)ds \cdot \underline{B},$$

Should read:

$$\underline{x}(t) = e^{\underline{A}\tau}\underline{x}(t-\tau) + \int_{t-\tau}^{t} e^{\underline{A}(t-s)} u(s)ds \cdot \underline{B},$$

Column 12, Line 63:

$$\underline{x}(t) = e^{\underline{A}\tau}\underline{x}(t-\tau) + \int_{t-\tau}^{t} e^{\underline{A}(t-s)} u(s)ds \cdot \underline{B},$$

Should read:

$$\underline{x}(t) = e^{\underline{A}\tau}\underline{x}(t-\tau) + \int_{t-\tau}^{t} e^{\underline{A}(t-s)} u(s)ds \cdot \underline{B},$$

Column 14, Line 23:

$$\underline{x}(t) = e^{\underline{A}\tau}\underline{x}(t-\tau) + \int_{t-\tau}^{t} e^{\underline{A}(t-s)} u(s)ds \cdot \underline{B},$$

Should read:

$$\underline{x}(t) = e^{\underline{A}\tau}\underline{x}(t-\tau) + \int_{t-\tau}^{t} e^{\underline{A}(t-s)} u(s)ds \cdot \underline{B},$$

Signed and Sealed this
Seventh Day of May, 2019

Andrei Iancu
*Director of the United States Patent and Trademark Office*